United States Patent [19]

Philips

[11] 4,363,770

[45] Dec. 14, 1982

[54] MOLDED SHELLS FOR LUGGAGE AND THE LIKE

[75] Inventor: Gary Philips, Youngstown, Ohio

[73] Assignee: Airway Industries, Inc., Ellwood City, Pa.

[21] Appl. No.: 252,320

[22] Filed: Apr. 9, 1981

Related U.S. Application Data

[62] Division of Ser. No. 196,021, Oct. 10, 1980.

[51] Int. Cl.³ .............................................. B28B 1/26
[52] U.S. Cl. ...................................... 264/87; 264/325
[58] Field of Search .................. 264/325, 87, 101, 517

[56] References Cited

U.S. PATENT DOCUMENTS 4,203,936  5/1980  Kiwak .................................... 264/87
4,238,176  12/1980  Cottrell ................................. 264/87

*Primary Examiner*—John A. Parrish
*Attorney, Agent, or Firm*—Buell, Blenko, Ziesenheim & Beck

[57] ABSTRACT

The specification discloses a shell for luggage and the like comprising wood fibers, glass fibers, paper scrap, glass beads, and plastic resin. The mixture is blended with water to form a slurry, is vacuum formed and is then molded under heat and pressure.

3 Claims, No Drawings

MOLDED SHELLS FOR LUGGAGE AND THE LIKE

This application is a division of my co-pending application Ser. No. 196,021, filed Oct. 10, 1980.

This invention relates to molding of body shells for hard sided luggage and the like. More particularly, it relates to methods and to compositions for performing such molding.

In the manufacture of hard sided luggage it is customary to manufacture the body shells by molding and curing them followed by covering with sheet material and attachment of appropriate hardware, fittings, interior trim, etc. Such shells have been produced by blending various fibrous and filler material with a plastic resin and then molding the same under heat and temperature to form a shell. A previously used formula is as follows:

42% unbleached kraft wood pulp
32% corrugated paper scrap
6% polyvinyl-acetate homopolymer
6% long fiber wood product
½% one-quarter inch chopped continuous strand glass filaments
4% wood chips
9½% shredded debarked wood I have discovered that the properties of shells made from such a formula may be significantly improved by omitting the long fiber wood product and by adding glass beads. I prefer to use glass beads which are microscopic in size and are hollow. It would be expected that elimination of fibrous product would tend to reduce the strength of the molded shells. Also, it would be expected that introduction of essentially spherical glass beads would not increase the structural properties of molded shells. It was found, however, contrary to such expectations, that the use of such glass beads does in fact produce a superior product. It is believed that the glass beads penetrate into the interstices of the mix and thereby form a product which is without voids and which is denser and more solid than the prior product.

I provide a mixture comprising wood products, glass beads and a plastic resin. I prefer to provide wood products as a major constituent and glass beads and resin as minor constituents. I further prefer to provide glass strand in the mixture. In a presently preferred mixture I provide a major portion of wood products and corrugated paper scrap such that the amount of wood products and paper scrap taken together exceeds 80% to 85% of the weight of the mixture. In the presently preferred mixture approximately one-third of the mixture is corrugated paper scrap.

In a presently preferred embodiment of the invention I provide a mix of the following composition by weight:

42% unbleached kraft wood pulp
32% corrugated paper scrap
6% polyvinyl-acetate homopolymer
6% glass beads
½% one-quarter inch chopped continuous strand glass filaments
4% wood chips through 0.040 inch screen
9½% shredded debarked wood I may, however, vary the amounts of various constituents. I may, for example, provide a mixture having from about 6% to about 8% by weight of glass and from about 6% to 8% by weight of resin. Amounts of other materials may be judiciously varied without detracting from the practice of the invention.

In the manufacture of luggage shells I prefer to add glass beads to the resin and then to mix them in a pulper with other constituents. I prefer to provide about 800 gallons of water to each 117 pounds of material for mixing in the pulper. The pulper causes degradation and reduction in size of the wood products but not of the glass beads or the glass fibers. After mixing and blending in the pulper I prefer to add an additional 2,000 gallons of water and to agitate the mixture by bubbling of air therethrough. The pulp is then placed on a vacuum screen by which water is withdrawn from the pulp and the solids are shaped to the general configuration of the luggage shell. The shaped material is then transferred to a mold where the shell is formed by subjecting the material to heat and pressure in a mold.

I have found that when about 6% of glass beads and 6% resin are present they tend to infiltrate and fill out voids in the mix. When the amounts of glass beads and resin each exceed about 8% material tends to be thrown off and does not fully penetrate and lodge within voids in the shell. If the amount of glass beads and resin is less than about 6%, then the voids are not fully packed, leading to a reduction in strength of the molded shell.

While I have illustrated and described a present and preferred embodiment of my invention it is to be understood that I do not limit myself thereto and that my invention may otherwise be variously practiced within the scope of the following claims.

I claim:

1. The method of manufacturing a shell for luggage and the like comprising blending glass beads and resin with fibrous wood products and water to form a slurry, vacuum forming the slurry to the configuration of a shell and then molding the same by application of heat and pressure.

2. The method of manufacturing a shell for luggage and the like of claim 1 in which the glass beads do not exceed about 8% weight of the shell.

3. The method of manufacturing a shell for luggage and the like of claim 1 in which the glass beads and resin are each present in amounts of between about 6% and 8% by weight.

* * * * *